(12) United States Patent
Derderian et al.

(10) Patent No.: US 8,178,644 B2
(45) Date of Patent: May 15, 2012

(54) IMPACT-RESISTANT POLYURETHANE

(75) Inventors: Edmond Derderian, Charleston, WV (US); Richard Gerkin, Cross Lanes, WV (US)

(73) Assignee: PolyPlexx, LLC, South Charleston, WV (US)

( * ) Notice: Subject to any disclaimer, the term of this patent is extended or adjusted under 35 U.S.C. 154(b) by 0 days.

(21) Appl. No.: 11/971,843

(22) Filed: Jan. 9, 2008

(65) Prior Publication Data

US 2009/0171060 A1 Jul. 2, 2009

Related U.S. Application Data

(63) Continuation-in-part of application No. 11/968,622, filed on Jan. 2, 2008, now abandoned.

(51) Int. Cl.
| | |
|---|---|
| C08G 18/10 | (2006.01) |
| C08G 18/32 | (2006.01) |
| C08G 18/50 | (2006.01) |
| C08G 18/73 | (2006.01) |
| C08G 18/75 | (2006.01) |

(52) U.S. Cl. .......... 528/60; 528/64; 528/65; 528/66; 528/76

(58) Field of Classification Search .......... 528/60, 528/64, 65, 66, 76
See application file for complete search history.

(56) References Cited

U.S. PATENT DOCUMENTS

| | | | |
|---|---|---|---|
| 3,866,242 A | 2/1975 | Slagel | |
| 4,297,444 A | 10/1981 | Gilbert et al. | |
| 4,383,051 A | 5/1983 | Meyborg et al. | |
| 4,433,067 A | 2/1984 | Rice | |
| 4,443,563 A | 4/1984 | Dirlikov et al. | |
| 4,456,729 A | 6/1984 | Dhein | |
| 4,474,900 A | 10/1984 | Dominguez | |
| 4,476,292 A | 10/1984 | Ham et al. | |
| 4,530,941 A | 7/1985 | Turner | |
| 4,564,645 A | 1/1986 | Salzburg | |
| 4,642,320 A | 2/1987 | Turner | |
| 4,686,242 A | 8/1987 | Turner | |
| 4,705,814 A | 11/1987 | Grigsby | |
| 4,732,919 A | 3/1988 | Grigsby | |
| 4,808,690 A | 2/1989 | Slagel | |
| 4,891,271 A * | 1/1990 | Bravet et al. | 428/423.1 |
| 4,910,279 A | 3/1990 | Gillis | |
| 4,933,416 A | 6/1990 | Gillis | |
| 5,013,813 A | 5/1991 | Zimmerman | |
| 5,317,076 A | 5/1994 | Primeaux | |
| 5,510,445 A * | 4/1996 | Haider et al. | 528/60 |
| 5,616,677 A | 4/1997 | Primeaux | |
| 5,668,239 A | 9/1997 | Nodelman | |
| 5,739,253 A * | 4/1998 | Nodelman et al. | 528/60 |
| 5,962,617 A | 10/1999 | Slagel | |
| 6,127,505 A | 10/2000 | Slagel | |
| 6,187,892 B1 | 2/2001 | Markusch | |
| 6,562,932 B1 | 5/2003 | Markusch | |
| 6,733,887 B2 | 5/2004 | Okoroafor et al. | |
| 6,734,272 B2 | 5/2004 | Tamura | |
| 6,939,939 B2 | 9/2005 | Slagel | |
| 7,144,969 B2 | 12/2006 | McDonald | |
| 7,216,976 B2 | 5/2007 | Tamura | |

FOREIGN PATENT DOCUMENTS

JP    7-53656 A  *  2/1995

* cited by examiner

*Primary Examiner* — Rabon Sergent
(74) *Attorney, Agent, or Firm* — Andrew S Reiskind

(57) ABSTRACT

The present invention teaches a new process to produce novel, hard, optically clear, impact-resistant polyurethane polymers that are characterized by excellent thermo mechanical properties and chemical resistance, and the polymers made as a result of such a process. The polyurethanes are made by reacting a) a prepolymer made by reacting a polyisocyanate with a primary amine-terminated polyether with an amine functionality of about 2 and a molecular weight of >1000, and in which the free —NCO content of the resulting prepolymer is >18% by weight; with b) (i) a polyol having an average hydroxyl functionality greater than or equal to 2 and an average hydroxyl equivalent weight of from about 300 to about 1,000, and (ii) a curing agent that has isocyanate reactive groups, a functionality of 2 to 3 and a molecular weight of <400. More preferably the prepolymer is made by reacting a cycloaliphatic polyisocyanate with a primary amine-terminated polyether diamine of 2000 to about 2500 molecular weight, the polyol is either a polyester polyol triol with a molecular weight of between about 540 and 900, or a polyether glycol with a molecular weight of between about 650 and 2000, or a polyester polyol diol with a molecular weight of up to 2,000, and the curing agent is either dianhydrohexitol, an aromatic diamine, an aromatic ring containing diol or a cyclohexanedimethanol.

20 Claims, No Drawings

IMPACT-RESISTANT POLYURETHANE

PRIORITY

This application is a continuation in part of U.S. patent application Ser. No. 11/968,622, filed Jan. 2, 2008 entitled "Impact—Resistant Polyurethanes", now abandoned.

SCOPE OF INVENTION

The present invention relates to hard, optically clear, impact-resistant polyurethanes that are characterized by excellent thermo mechanical properties and chemical resistance, and which may contain a biomass-derived component.

BACKGROUND OF THE INVENTION

Polyurethanes are a known class of materials that have found extensive commercial application because of their excellent physical properties. These polymers are suitable for molding, spraying, and coating products where tensile strength, toughness, and impact resistance are required. In many of the established manufacturing processes it is preferred to employ a one-shot system whereby the polyisocyanate and active hydrogen compounds are converted to the final product in a single reaction step. In other known processes an intermediate product, usually called a prepolymer, is formed first by reacting a stoichiometric excess of a polyisocyanate with an active hydrogen compound, and the prepolymer is subsequently converted to the final polymer in a second reaction involving a further active hydrogen compound, commonly called a chain extender or curing agent.

An example of polyurethane chemistry is disclosed in U.S. Pat. No. 4,933,416 to Gillis, which teaches the use of prepolymers to make polyurethane polymers using isocyanate, a polyol having an average nominal hydroxyl functionality greater than 2 and an average hydroxyl equivalent weight of from about 500 to about 5,000 and polymeric polyamine having an average nominal primary and/or secondary amino functionality of from about 2 to about 3 and an average amine equivalent weight of from about 500 to about 5000. However, this prior art exemplifies the use of only aromatic isocyanates, and restricts the hydroxyl [—OH] equivalent weight of the polyol to be used to be higher than about 500. Moreover, Gillis teaches that if the prepolymer is made by utilizing just one active hydrogen compound, that compound is a trifunctional one.

U.S. Pat. No. 4,443,563 to Dirlikoff et al. discloses the use of dianhydrohexitol as an active hydrogen compound in the preparation of polyurethane; however, this reference teaches making the polymer in a one step process via solution polymerization and subsequent precipitation into an non-organic solvent (for the polyurethane). Such a process is undesirable since the polyurethane must be separated from the solvent to be used.

U.S. Pat. No. 4,564,645 to Salzburg et al. teaches the use of dianhydrohexitol in the preparation of a polyurethane; however it specifies a specific ratio of three isomers of dianhydrohexitol needed to yield a liquid product. The polyurethanes are prepared by reacting an organic polyisocyanate with a compound containing at least two active hydrogen atoms and having a molecular weight of from 400 to 10,000, a chain-extending agent, optionally other short-chain compounds containing at least two active hydrogen atoms and having a molecular weight of from 32 to 399. The chain-extending agent used is a liquid isomer mixture of 1,4-3,6-dianhydrohexitols, preferably 1,4-3,6-dianhydro-D-sorbitol and/or 1,4-3,6-dianhydro-D-mannitol in addition to isomer mixtures containing 1,4-3,6-dianhydroiditol. Additionally, it states that if a prepolymer process is used, the percentage NCO-content of the prepolymer must be between 1 and 18 wt % and preferably 3 to 16 wt %. These mixtures may be used in admixture with low molecular weight compounds preferably polyols having a molecular weight in the range from 62 to 250.

SUMMARY OF THE INVENTION

The present invention teaches a new process to produce hard, optically clear, impact-resistant polyurethane polymers which are characterized by excellent thermo mechanical properties and chemical resistance. While the process involves utilization of known urethane intermediates, the novelty is contained in the specifics of how these intermediates are allowed to react to form the polymer and therefore the resulting polymer and its properties are surprisingly novel. Furthermore, only certain species within the class of known polyurethane intermediates can be used to form the prepolymer, which is utilized to make the clear, hard polymers of interest.

DETAILED DESCRIPTION OF THE INVENTION

The novel polyurethane of the present invention is made using a process in which a prepolymer is made from a primary amine-terminated polyether and an aliphatic polyisocyanate. This prepolymer is then subsequently reacted with a polyol and a chain extender. Surprisingly, the resulting polymers are both optically clear and very hard, are impact resistant and are characterized by excellent thermo mechanical properties and chemical resistance, especially in contrast to the generally soft and hazy polymers of the prior art.

More specifically, the polyurethane is the reaction product of:

1) A prepolymer made by the reaction of a stoichiometric excess of aliphatic polyisocyanate with a primary amine-terminated polyether with an amine functionality of about 2 and a molecular weight of >1000, and in which the free —NCO content of the resulting prepolymer is >18% by weight; and 2) a polyol having an average nominal hydroxyl functionality greater than or equal to 2 and an average hydroxyl equivalent weight of from about 300 to about 1,000, and 3) A curing agent that has isocyanate reactive groups, a functionality of 2 to 3 and a molecular weight of <400.

More preferably the polyurethane is the reaction product of:

1) A prepolymer made by reacting a cycloaliphatic polyisocyanate with a primary amine-terminated polyether diamine of 2000 to about 2500 molecular weight to give a prepolymer free-NCO content of >18%, more preferably from about 18% to 23%, and 2) A polyol selected from the group consisting of (a) a polyester polyol triol with a molecular weight of between about 540 and 900, or (b) a polyether glycol with a molecular weight of between about 650 and 2000, or (c) a polyester polyol diol with a molecular weight of up to 2,000, and 3) A curing agent selected from the group consisting of (a) dianhydrohexitol or (b) aromatic diamine, or (c) cyclohexanedimethanol or (d) aromatic ring-containing diols.

Among the prepolymer, polyol and curing agent, they should be present in the relative stoichiometric equivalents amounts of 1.0 to 1.1, 0.055 to 0.2 and 0.8 to 0.945, respectively.

Preferably the amine-terminated polyether used to form the prepolymer is essentially free of any other polyether, and more preferably free of, and is the sole reactant with the polyisocyanate. Moreover, the polyol used to react with the prepolymer should be essentially free, and more preferably free of polyols that have isocyanate reactive functionalities other than a hydroxyl functionality.

The order of addition of the reactants is important. Adding the polyol to the polyisocyanate to form the prepolymer will not yield a polymer that is clear and transparent and may not have the same good physical properties. Moreover, addition of the curing agent during formation of the prepolymer may have the same negative effect on the formation of the final polymer. Minor amounts of the curing agent or polyol may not yield negative results, but the formation of the prepolymer should be done in a process essentially free of curing agents and polyol and more preferably, free of the polyol and/or curing agent.

The resulting polymer is clear with the following properties: Vicat softening point (ASTM D 1525, Version A, load=10N) of >98° C., a hardness of >75 (ASTM D 2240-00, D durometer), and passes a "falling dart" impact test [Falling Dart Impact (Gardner) ASTM D3029, with no fracture of the polymer (weight is 900 g, impact tip is 0.31 cm radius, falling a distance of 107 cm., polymer resting on a support plate of inner diameter of 5.08 cm]. The polymers should have an optical transmittance of >83%.

The term "amine functionality" as used above in defining the primary amine-terminated polyether used in making the compositions of the invention means the amino functionality that a polyether would be expected to have in regard to the materials used in its manufacture. For example, a primary amine-terminated polyether prepared by the reductive amination of a polyether diol will have a nominal amino functionality of 2 although, in practice, the average hydroxyl functionality of the diol may be somewhat less than 2 and the conversion of hydroxyl to amino groups may not be entirely complete.

The average amino equivalent weight of the amine-terminated polyether is about 1,000, and is preferably in the range from about 1000 to about 1250. Mixtures of two or more amine-terminated polyethers varying in functionality, equivalent weight or chemical constitution may be used provided such mixtures conform to the average functionality and average equivalent weight criteria displayed above. Polyoxypropylene diamines and poly(oxyethylene-oxypropylene) diamines and mixtures of any of these are preferred. However, the amines should be essentially, and more preferably, free of, other isocyanate reactive groups.

The excess of organic polyisocyanate used in preparing the polyisocyanate compositions of the invention is suitably such that the compositions have free —NCO contents in the range from 18% to 25%, and especially from 18% to 23%, by weight.

The organic polyisocyanates that can be employed include aliphatic and cycloaliphatic diisocyanates and combinations thereof. Cycloaliphatic diisocyanates are preferred in the present invention. Representative of these types of diisocyanates are 4,4' dicyclohexylmethane diisocyanate, bis(1,4-isocyanatomethyl) cyclohexane, isophorone diisocyanate, and other similar diisocyanates.

The term "hydroxyl functionality" as used above means the hydroxyl functionality that a polyol would be expected to have in regard to its monomeric components. For example, a polyol prepared by the addition of propylene oxide to a glycol will have a hydroxyl functionality of 2 although, in practice, its average functionality will be somewhat less than 2. Thus, for a polyether, the average hydroxyl functionality is the average functionality (number of active hydrogen atoms) of the initiator or initiators used in its preparation.

The average hydroxyl functionality of the polyol used in compositions of the invention is typically from 2 to 6. The average hydroxyl equivalent weight of the polyol is preferably in the range from 300 to 1,000. Mixtures of two or more polyols varying in equivalent weight or chemical constitution may be used provided such mixture conform to the average functionality and average equivalent weight criteria displayed above.

As examples of suitable polyols there may be mentioned polyesters, polycarbonates, hydroxyl-terminated polyolefins and, especially, polyethers. Suitable polyether polyols or mixtures of polyols may be selected from the reaction products of propylene oxide or propylene and ethylene oxides with polyfunctional initiators such as water, ethylene glycol, propylene glycol, diethylene glycol, glycerol, trimethylolpropane, pentaerythritol or sorbitol. Especially useful polyethers include polytetramethylene ether glycols and polyoxypropylene triols and poly(oxyethylene-oxypropylene) triols obtained by the simultaneous or sequential addition of ethylene and propylene oxides to trifunctional initiators. In some cases, ethylene oxide tipped triols are preferred because of their enhanced reactivity. Polyesters obtained by the ring-opening polymerization of lactones, for example caprolactone, in the presence of a polyol and a catalyst, are a preferred polyol.

Preferably, the polyol should be essentially free of, and more preferably free of, isocyanate reactive groups other than the hydroxyl functionality.

A curing agent of the present invention is a molecule that has isocyanate reactive groups, a functionality of 2 to 3 and a molecular weight <400. Functionality refers to the number of isocyanate reactive groups on average on each molecule. Chain-extending agents that may be employed include those compounds having at least two functional groups bearing active hydrogen atoms such as hydrazine, primary and secondary diamines, amino alcohols, glycols or mixtures thereof. 1,4-butanediol can be used as a chain extender to make clear polymers; however, polyurethanes made with 1,4-butanediol tend to have low (<75° C.) Vicat softening points and, therefore, are not suitable. Therefore, preferred groups of curing agents includes cyclohexanedimethanol, aromatic ring-containing diols, dianhydrohexitols or aromatic diamines. Preferred aromatic diamines include methylenebis orthochloroaniline (MOCA) and diethyltoluenediamine.

The dianhydrohexitols that may be used herein are the 1:4-3:6 dianhydro analogs of mannitol, sorbitol and iditol. The use of dianhydrohexitol, which can be a biomass-derived component, results in the formation of non-yellowing polyurethanes, a further benefit. The three dianhydrohexitols are commonly known as isomannide, isosorbide and isoidide after their respective parent hexitols. Of the aforementioned hexitols, isosorbide is most preferred. It is a ring-containing diol containing two nonequivalent hydroxyl groups (i.e., endo-5 and exo-2). Sorbitol is a particularly preferred starting material because it is produced from sugar waste and cellulose. Each particular dianhydrohexitol is prepared by the acid-catalyzed dehydration and cyclization of the parent hexitol or the intermediate 1:4 or 3:6 monoanhydrohexitol.

The cyclohexanedimethanols that may be used herein are 1,4-cyclohexanedimethanol and 1,3-cyclohexanedimethanol (and mixtures thereof). The aromatic ring-containing diols that may be used herein are bis(hydroxyethyl) hydroquinone, and bisphenol A.

Preferably, the curing agent should be essentially free of, and more preferably free of, isocyanate reactive groups other than the aforementioned amine or hydroxyl groups, respectively.

A catalyst may be optionally employed in the preparation of the polyurethane. The most preferred catalysts are those metallo-organic catalysts which include, for example, stannous acetate, stannous butyrate, stannous laurate, stannous octoate, stannous oleate, cobalt naphthenate, zinc naphthenate, cadmium naphthenate, dibutyltin dilaurate, dibutyltin-di-2-ethylhexoate, dimethyltin dineodecanoate and the like. Other suitable urethane catalysts which may be used include tertiary amines such as, for example, triethylenediamine, N-methyl morpholine, N-ethyl morpholine, diethyl ethanolamine, 1-methyl-4-dimethylaminoethyl piperazine, 3-methoxy-N-dimethylpropyl amine, N,N-dimethyl-N',N'-methyl isopropyl propylenediamine, N,N-dimethyl-3-diethylaminopropyl amine, dimethyl benzyl amine, triethylene diamine, and the like.

The quantity of catalyst that is optionally employed is generally dependent upon its activity and/or the temperature of the reaction mass. In general, quantities between about 0.005 and about 2.0 weight percent of catalyst, based on the combined weight of the reactants can be used, with 0.02 to 0.15 wt % being preferred.

The following sequence is preferred for preparing the polyurethanes of this invention. The prepolymer to be used is prepared first and its free —NCO content determined (this is referred to as the "A" side of the polyurethane system). The prepolymer is then combined with the polyol, curing agent, catalyst and optionally other additives (such as stabilizers, dyes, fillers, etc.), (referred to as the "B" side) according to the required stoichiometry based on —NCO content of the prepolymer as against hydroxyl functionality of the polyol and the reactive functionalities of the curing agent. Both the A and B sides are degassed to remove residual gases. The A and B sides are mixed (such as in a commercially available Speed-Mixer™ from FlackTek, Inc.) and the mixture is poured into a mold to be held at a suitable temperature. Generally, reactions are complete within one hour.

Preferred reaction conditions for the manufacture of the polyurethanes of the present invention are: Prepolymer formation temperature of between about 40 and 85° C., and polyurethane formation [(B side, i.e., polyol and curing agent) and prepolymer (A side)] temperature of between about 40 and 100° C., preferably between 40 and 85° C., and catalyst concentration between 0.02 and 0.15 wt % of the total, and mold temperature >90° C.

The polyurethanes may be made by reaction injection molding (RIM) whereby the reactive liquid streams (A side and B side) are impingement-mixed and rapidly injected into a mold cavity.

The polyurethanes of the present invention may be used according to those known uses of polyurethanes. However, given the clarity and hardness of the polyurethanes of the present invention, preferable uses for them is in the general areas of viewports, lenses, goggles, face shields, and other glazing-type applications. Such products may be formed by casting the reaction mixture into the desired shapes at a thickness of from about 0.0625 to 1 inch thick. The moldings also may be made by injection molding if no functionality of the polyol is greater than about 2.

EXAMPLES

Glossary for the Examples

Polyester 1=Polycaprolactone triol, Tone® 0310, The Dow Chemical Co., equivalent weight (eq. wt.)=296.8

Polyester 2=Polycaprolactone triol, CAPA®3050, Solvay, eq. wt.=180.04

Polyether 1=Polytetrahydrofuran diol, Terathane® T-2000, Invista, eq. wt.=1000

Polyether 2=Polytetrahydrofuran diol, Terathane® T-650, Invista, eq. wt.=319.48

Amine-terminated polyether 1=Jeffamine® D-2000 (difunctional amine), Huntsman, eq. wt.=980.4

Amine-terminated polyether 2=Jeffamine® T-5000 (trifunctional amine), Huntsman, eq. wt.=1667.67

Isocyanate 1=4,4' Dicyclohexylmethane Diisocyanate Desmodur® W, Bayer, eq. wt.=131.18

Chain extender 1=Isosorbide, >99% purity, mp 62° C.

Chain extender 2=Ethacure™ 100LC, diethyltoluenediamine (DETDA), Albemarle Corp., eq. wt.=89.15 or Lonzacure® DETDA 80 LC, Lonza, Ltd, eq. wt 89.15.

Chain extender 3=UNOXOL™ Diol, cyclohexanedimethanol mixed isomers, The Dow Chemical Co., eq.wt.=72.1.

Catalyst 1=Fomrez® catalyst UL-28, GE.

Example 1

Prepolymer 12-86-1

160.0 g (1.219 eq.) of Isocyanate 1 was added to a reaction flask equipped with a nitrogen inlet, stirrer, dropping funnel, heating mantle and thermocouple. The sample was placed under nitrogen and heated to 80° C., with stirring. 96.24 g (0.0982 eq.) of Amine-terminated polyether 1, was placed in the dropping funnel and added to the isocyanate over a period of 20 minutes. The temperature rose to 86.5° C. and the reaction was held at that temperature for 30 min. after the polyether was added. The prepolymer was transferred to a storage container under nitrogen and placed in an oven at 70 to 80° C. for about 16 hrs. Theoretical free-NCO of this prepolymer was 18.38%, actual was 18.32%, and equivalent weight was 229.26.

Example 2

Polymer, 60% Hard Segment 12-87-1

52.55 g of the prepolymer from Example 1 (the A-side), was added to a small container. In a separate container, the B-side was prepared by mixing 13.07 g of Polyether 2 (T-650) with 16.39 g of Chain Extender 2 (DETDA) and 0.028 g of Catalyst 1. These ingredients were then heated to about 100° C. and placed in a vacuum desiccator under full vacuum for 20 min to degas the system. The reactants were allowed to cool to 40° C. The A and B sides were then poured together at a stoichiometric equivalency ratio and mixed by hand using a wooded spatula for 0.75 min. The mixture was poured into a mold comprised of top and bottom polytetrafluoroethylene (PTFE) sheets and a 0.125 inch aluminum spacer. The mold was held at 150° C. and the polymer was molded at a pressure of about 1800 psi in a heated platen press for 1.0 hr. Upon demolding and cooling, the polymer had a durometer hardness of 76 D, did not break on demolding and was clear.

Example 3

Prepolymer 28-8-1

Per the method described in Example 1, 169.99 g (1.296 eq.) of Isocyanate 1 and 84.23 g (0.0859 eq.) of Amine-terminated polyether 1 were combined to make a prepolymer with a free-NCO content of 19.89% (theory=19.99%), and equivalent weight of 211.16.

Example 4

Polymer, 65% Hard Segment 28-8-2

Per the method described in Example 2, 51.74 g of the prepolymer from Example 3, 11.72 g of Polyether 2 and 18.12 g of Chain Extender 2 and 0.028 g of Catalyst 1 were mixed and molded to make a polymer which was clear and tough on demold.

Example 5

Prepolymer 32-58-1

Per the method described in Example 1, 169.42 g (1.29 eq.) of Isocyanate 1 and 96.16 g (0.098 eq.) of Amine-terminated polyether 1 were combined to make a prepolymer with a free-NCO content of 17.9% (theory=18.87%), and equivalent weight of 234.9.

Example 6

Polymer 32-59-2

In this preparation, mixing of the components was accomplished using a Model D-400 Speedmixer™ from FlackTek Inc. Mixing conditions were: 15 sec@800 rpm, 5 sec@zero rpm and 20 sec@200 rpm. Additionally, the mold was comprised of two tempered glass sheets 0.25 inch thick on either side of the 0.125 inch spacer. The glass sheets were previously treated with Rainex™ glass treatment to allow demolding of the polymer.

The prepolymer from Example 5, (55.29 g) was placed in the mixing cup for the Speedmixer™. The B side, (12.78 g of Polyether 2 and 13.93 g of Chain Extender 1 (handled as a molten material) and 0.084 g Catalyst 1) was placed in a separate container and both sides were degassed for 20 minutes under full vacuum. Each side was then placed in an oven and heated; A side to 73.5° C., B side to 71.5° C. The stoichiometric equivalent amount of B side was poured into the A side and mixed per the protocol noted above. The mixed components then were poured into the mold which had been preheated to 93° C. and allowed to cure for 41 min. The polymer was clear and had a durometer hardness of 75D and a Vicat A softening temperature of 98.3° C.

Example 7

Polymer, 64.2% Hard Segment 32-60-1

The free-NCO content of the prepolymer form Example 5 was raised by adding more Isocyanate 1 to the existing prepolymer. In this Example, 5.53 g of Isocyanate 1 was added to 49.48 g of the prepolymer of Example 5 raising the free-NCO to 19.3%. This prepolymer then was allowed to react with 11.44 g Polyether 2, 8.61 g of Chain Extender 1 and 0.084 g Catalyst 1 as described in Example 6. Reaction conditions were: A side temperature 74° C., B side temperature 73.5° C. and mold temperature 93° C. The polymer had a durometer hardness of 79D, was completely clear and had a Vicat A softening temperature of 102° C.

Example 8

Polymer, 67.4% Hard Segment 32-61-1

The free-NCO content of the prepolymer from Example 5 was raised by adding more Isocyanate 1 to the existing prepolymer. In this Example, 9.8 g of Isocyanate 1 was added to 45 g of the prepolymer of Example 5 raising the free-NCO to 20.4%. This prepolymer then was allowed to react with 10.4 g of Polyether 2, 16.8.2 g of Chain extender 1 and 0.084 g Catalyst 1 as described in Example 6. Reaction conditions were: A side temperature 74° C., B side temperature 73.8° C. and mold temperature 93° C. The polymer had a durometer hardness of 81 D, was completely clear and had a Vicat A softening temperature of 106° C.

Example 9

Prepolymer 32-63-1

Per the method described in Example 1, 169.83 g (1.294 eq.) of Isocyanate 1 and 98.95 g (0.101 eq.) of Amine-terminated polyether 1 were combined to make a prepolymer with a Free-NCO content of 18.94% (theory=18.65%), and equivalent weight of 221.75.

Example 10

Polymer, 60% Hard Segment 32-64-4

The prepolymer from Example 10, (54.45 g) was placed in the mixing cup for the Speedmixer™. The B side, 12.75 g Polyester 1, 14.8 g Chain extender 1 (handled as a molten material) and 0.084 g of Catalyst 1, was placed in a separate container and both were degassed for 20 minutes under full vacuum. Each side was then placed in an oven and heated; A side to 74.2° C., B side to 67.6° C. The stoichiometric equivalent amount of B side was poured into the A side and mixed per the protocol noted above. The mixed components then were poured into the mold which had been preheated to 93° C. and allowed to cure for 30 min. The polymer was clear had a durometer hardness of 80 D and passed the Gardner Impact test.

Example 11

Prepolymer 32-95-1

Per the method described in Example 1, 412.11 g (3.14 eq.) of Isocyanate 1 and 185.56 g (0.189 eq.) of Amine-terminated polyether 1 were combined to make a prepolymer with a free-NCO content of 20.4% (theory=20.75%), and equivalent weight of 205.68.

Example 12

Polymer, 70% Hard Segment 42-1-2

The prepolymer from Example 11, (57.57 g) was placed in the mixing cup for the Speedmixer™. The B side, 6.7 g of Polyester 2, 17.73 g of Chain extender 1 (handled as a molten material) and 0.084 g of Catalyst 1, was placed in a separate container and both were degassed for 20 minutes under full vacuum. Each side was then placed in an oven and heated; A side to 94.8° C., B side to 58.1° C. The correct amount of B side was poured into the A side and mixed per the protocol noted above. The mixed components were then poured into the mold which had been preheated to 104° C. and allowed to cure for 30 min. The polymer was clear, passed the Gardner Impact test, had a durometer hardness of 84 D, and a Vicat A softening temperature of 120° C.

Example 13

Prepolymer 42-21-1

Per the method described in Example 1, 255.89 g (1.95 eq.) of Isocyanate 1 and 90.99 g (0.093 eq.) of Amine-terminated polyether 1 were combined to make a prepolymer with a free-NCO content of 22.51% (theory=22.49%), and equivalent weight of 186.34.

Example 14

Polymer, 75% Hard Segment 42-26-1

The prepolymer from Example 13, (56.88 g) was placed in the mixing cup for the Speedmixer™. The B side, 5.77 g of Polyester 2, 19.33 g of Chain extender 1 (handled as a molten material) and 0.112 g of Catalyst 1, was placed in a separate container and both were degassed for 20 minutes under full vacuum. Each side was then placed in an oven and heated; A side to 95.7° C., B side to 65.2° C. The stoichiometric equivalent amount of B side was poured into the A side and mixed per the protocol noted above. The mixed components were then poured into the mold which had been preheated to 104° C. and allowed to cure for 30 min. The polymer was clear and had a durometer hardness of 87 D.

Example 15

Prepolymer 42-23-1

Per the method described in Example 1, 484.83 g (3.69 eq.) of Isocyanate 1 and 218.31 g (0.222 eq.) of Amine-terminated polyether 1 were combined to make a prepolymer with a free-NCO content of 20.78% (theory=20.75%), and equivalent weight of 202.12.

Example 16

Polymer, 70% Hard Segment 42-28-3

The prepolymer from Example 15, (57.27) was placed in the mixing cup for the Speedmixer™. The B side, 6.78 g of Polyester 2, 17.7 g of Chain extender 3 and 0.056 g of Catalyst 1, was placed in a separate container and both were degassed for 20 minutes under full vacuum. Each side was then placed in an oven and heated; A side to 50.5° C., B side to 50.3° C. The stoichiometric equivalent amount of B side was poured into the A side and mixed per the protocol noted above. The mixed components then were poured into the mold which had been preheated to 104° C. and allowed to cure for 30 min. The polymer was clear, had a durometer hardness of 80 D and passed the Gardner Impact test.

COMPARATIVE EXAMPLES

Example 17

Prepolymer 42-10-1

Per the method described in Example 1, 217.94 g (1.66 eq.) of Isocyanate 1 and 98.81 g (0.0988 eq.) of Polyether 1 were combined to make a prepolymer with a free-NCO content of 20.7% (theory=20.72%), and equivalent weight of 202.9. This polyether was heated to 78° C. to melt it prior to adding to the dropping funnel.

Example 18

Polymer, 70% Hard Segment 42-12-1

57.38 g of the prepolymer from Example 17, was placed in the mixing cup for the Speedmixer™. The B side, 6.67 g of Polyester 2, 17.96 g of Chain extender 1 (handled as a molten material) and 0.084 g of Catalyst 1, was placed in a separate container and both were degassed for 20 minutes under full vacuum. Each side then was placed in an oven and heated; A side to 91.5° C., B side to 55.6° C. The stoichiometric equivalent amount of B side was poured into the A side and mixed per the protocol noted above. The mixed components were then poured into the mold which had been preheated to 104° C. and allowed to cure for 30 min. The polymer was very opaque.

Example 19

Prepolymer 42-16-1

Per the method described in Example 1, 254.54 g (1.94 eq.) of Isocyanate 1 and 42.74 g (0.237 eq.) of Polyester 2 were combined to make a prepolymer with a free-NCO content of 23.16% (Theory=24.09%), and equivalent weight of 181.35.

Example 20

Polymer, 70% Hard Segment 42-12-1

46.77 g of the prepolymer from Example 19 was placed in the mixing cup for the Speedmixer™. The B side, 17.7 g of Amine-terminated polyether 1, 17.53 g of Chain extender 1 (handled as a molten material) and 0.084 g of Catalyst 1, was placed in a separate container and both were degassed for 20 minutes under full vacuum. Each side then was placed in an oven and heated; A side to 90.6° C., B side to 54.8° C. The stoichiometric equivalent amount of B side was poured into the A side and mixed per the protocol noted above. The mixed components then were poured into the mold which had been preheated to 104° C. and allowed to cure for 30 min. The polymer was very opaque and broke on demolding.

Example 21

Prepolymer 12-88-1

Per the method described in Example 1, 160 g (1.22 eq.) of Isocyanate 1 and 63.67 g (0.199 eq.) of Polyether 2 were combined to make a prepolymer with a free-NCO content of 18.85% (theory=18.38%), and equivalent weight of 222.81.

Example 22

Polymer, 60% Hard Segment 12-87-2

46.16 g of the prepolymer from Example 21 (the A-side), was added to a small container. In a separate container, the B-side was prepared by mixing 19.51 g of Amine-terminated polyether 1 with 16.33 g of Chain Extender 2 (DETDA) and 0.028 g of Catalyst 1. These ingredients then were heated to about 100° C. and placed in a vacuum desiccator under full vacuum for 20 min to degas the system. The reactants were allowed to cool to 40° C. The A and B sides then were poured together at the stoichiometric equivalent ratio and mixed by hand using a wooded spatula for 0.75 min. The mixture was poured into a mold comprised of top and bottom PTFE sheets and a 0.125 inch aluminum spacer. The mold was held at 150° C. and the polymer was molded at a pressure of about 1800 psi in a heated platen press for 1.0 hr. Upon demolding and cooling, the polymer had a durometer hardness of 79 D, was very hazy, and passed the impact test.

Example 23

Prepolymer 28-37-1

Per the method described in Example 1, 165.1 g (1.26 eq.) of Isocyanate 1 and 59.62 g (0.187 eq.) of Polyether 2 were combined to make a prepolymer with a free-NCO content of 19.74% (theory=20.0%), and equivalent weight of 212.7.

Example 24

Polymer, 62.5% Hard Segment 28-39-1

46.22 g of the prepolymer from Example 23 (the A-side), was added to a small container. In a separate container, the B-side was prepared by mixing 18.42 g of Amine-terminated polyether 1 with 17.36 g of Chain Extender 2 (DETDA) and 0.028 g of Catalyst 1. These ingredients then were heated to about 100° C. and placed in a vacuum desiccator under full vacuum for 20 min to degas the system. The reactants were allowed to cool, A side to 49.1° C., B side to 43.6° C. The A and B sides then were poured together at the stoichiometric equivalent ratio and mixed by hand using a wooded spatula for 0.75 min. The mixture was poured into a mold comprised of top and bottom PTFE sheets and a 0.125 inch aluminum spacer. The mold was held at 150° C. and the polymer was molded at a pressure of about 1800 psi in a heated platen press for 1.0 hr. Upon demolding and cooling, the polymer was hazy.

Example 25

Prepolymer 32-56-1

Per the method described in Example 1, 169.42 g (1.29 eq.) of Isocyanate 1, 96.16 g (0.098 eq.) of Amine-terminated polyether 1 and 63.62 g (0.199 eq.) of Polyether 2 (note: the Amine-terminated polyether 1 and Polyether 2 were premixed prior to addition to the isocyanate) were combined to make a prepolymer with a free-NCO content of 13.5% (theory=12.7%), and equivalent weight of 301.08.

Example 26

Polymer, 60.8% Hard Segment 32-57-2

The prepolymer from Example 25, (66.24 g) was placed in the mixing cup for the Speedmixer™. The B side, 17.53 g of Chain extender 2 (handled as a molten material) and 0.084 g of Catalyst 1, was placed in a separate container and both were degassed for 20 minutes under full vacuum. Each side was then placed in an oven and heated; A side to 64.9° C., B side to 62.8° C. The stoichiometric equivalent amount of B side was poured into the A side and mixed per the protocol noted above. The mixed components were then poured into the mold which had been preheated to 120° C. and allowed to cure for 30 min. The polymer was brittle, and broke on demolding.

Example 27

Prepolymer 32-85-1

Per the method described in Example 1, 180.3 g (1.37 eq.) of Isocyanate 1, 72.29 g (0.074 eq.) of Amine-terminated polyether 1 and 16.96 g (0.01 eq.) of Amine-terminated polyether 2 (note, the Amine-terminated polyether's 1 and 2 were premixed prior to addition to the isocyanate) were combined to make a prepolymer with a free-NCO content of 20.1% (theory=20.11%), and equivalent weight of 208.96.

Example 28

Polymer, 65% Hard Segment 35-90-2

The prepolymer from Example 27, (54.88 g) was placed in the mixing cup for the Speedmixer™. The B side, 16.6 g of Chain extender 1 (handled as a molten material) and 0.084 g of Catalyst 1 and 10.52 g of Polyester 1, was placed in a separate container and both were degassed for 20 minutes under full vacuum. Each side then was placed in a oven and heated; A side to 81.4° C., B side to 76.2° C. The stoichiometric equivalent amount of B side was poured into the A side and mixed per the protocol noted above. The mixed components then were poured into the mold which had been preheated to 127° C. and allowed to cure for 30 min. The polymer was completely opaque. A repeat of this experiment where the A side temperature was 79.7° C., the B side temperature was 77.6° C. and the mold temperature was 93° C. also gave a completely opaque polymer.

We claim:

1. A clear polyurethane comprising the reaction product of:
   a) a prepolymer made by reacting a stoichiometric excess of an aliphatic polyisocyanate with a primary amine-terminated polyether with an amine functionality of about 2 and an average amino equivalent weight of 1000 to 1250, and in which the free —NCO content of the resulting prepolymer is about 18% to 23% by weight; wherein the prepolymer is formed in a reaction that is essentially free of a polyether other than the primary amine-terminated polyether and
   b) (i) a polyol having an average nominal hydroxyl functionality greater than or equal to 2 and is selected from the group consisting of (a) a polyester polyol triol, (b) a polyether glycol, and (c) a polyester polyol diol, and (ii) a curing agent that has isocyanate reactive groups, a functionality of 2 to 3 and a molecular weight of <400 selected from the group consisting of (a) dianhydrohexitol; (b) aromatic diamines; (c) cyclohexanedimethanols; and (d) aromatic ring containing diols.

2. The polyurethane according to claim 1 wherein the primary amine-terminated polyether has a molecular weight of 2,000 to about 2,500 and the prepolymer has a free —NCO content of about 18% to 23% by weight.

3. The polyurethane according to claim 2 wherein the polyol is a polyester polyol triol with a molecular weight of between about 540 and 900.

4. The polyurethane according to claim 2 wherein the curing agent is selected from the group consisting of (a) dianhydrohexitol; and (b) cyclohexanedimethanols.

5. The polyurethane according to claim 4 wherein the polyol is selected from the group consisting of (a) a polyester polyol triol with a molecular weight of between about 540 and 900, or (b) a polyether glycol with a molecular weight of between about 650 and 2000.

6. The polyurethane according to claim 2 wherein the curing agent is a dianhydrohexitol.

7. The polyurethane according to claim 3 wherein the curing agent is an aromatic ring containing diol.

8. The polyurethane according to claim 4 wherein the polyol is a polyester polyol diol with a molecular weight of up to 2,000.

9. The polyurethane according to claim 6 wherein the polyol is a polyester polyol triol with a molecular weight of between about 540 and 900.

10. A process comprising:
   a) forming a prepolymer made by reacting a stoichiometric excess of aliphatic polyisocyanate with a primary amine-terminated polyether with an amine functionality of about 2 and an average amino equivalent weight of 1000 to 1250, and in which the free —NCO content of the resulting prepolymer is about 18% to 23% by weight; and
   b) reacting the prepolymer formed in step (a) with (i) a polyol having an average nominal hydroxyl functionality greater than or equal to 2 selected from the group consisting of (a) a polyester polyol triol, (b) a polyether glycol, and (c) a polyester polyol diol, and (ii) a curing agent that has isocyanate reactive groups, a functionality of 2 to 3 and a molecular weight of <400 selected from the group consisting of (a) dianhydrohexitol; (b) aromatic diamines; (c) cyclohexanedimethanols; and (d) aromatic ring containing diols so as to yield a clear polyurethane; and
   wherein the process step of forming a prepolymer is essentially free of any polyether other than the primary amine-terminated polyether.

11. The process according to claim 10 wherein the primary amine-terminated polyether has a molecular weight of 2,000 to about 2500 and the prepolymer has a free —NCO content of about 18% to 23% by weight.

12. The process according to claim 11 wherein the polyol is a polyester polyol triol with a molecular weight of between about 540 and 900.

13. The process according to claim 12 wherein the curing agent is selected from the group consisting of (a) dianhydrohexitol, and (b) cyclohexanedimethanol.

14. The process according to claim 10 wherein the polyol is a polyester polyol triol with a molecular weight of between about 540 and 900.

15. The process according to claim 14 wherein the curing agent is selected from the group consisting of (a) dianhydrohexitol and (b) cyclohexanedimethanol.

16. The process according to claim 10 wherein the curing agent is dianhydrohexitol.

17. The process according to claim 16 wherein the polyol is a polyester polyol diol with a molecular weight of up to 2,000.

18. The process according to claim 11 wherein the polyol is a polyester polyol triol with a molecular weight of between 540 and 900.

19. The process according to claim 12 wherein the curing agent is diethyltoluenediamine.

20. The process according to claim 14 wherein the curing agent is isosorbide.

* * * * *